United States Patent
Rao et al.

(10) Patent No.: US 9,990,824 B2
(45) Date of Patent: Jun. 5, 2018

(54) SYSTEM AND METHOD FOR DETECTING FIRE LOCATION

(71) Applicant: Tyco Fire & Security GmbH, Neuhausen am Rheinfall (CH)

(72) Inventors: Manjuprakash Rama Rao, Bangalore (IN); Surajit Borah, Bangalore (IN); Sreenath K. Ramanna, Bangalore (IN); P. U. Kamruddin, Bangalore (IN); Andrew Rynkiewicz, Bracknell (GB); Clive Weston, Frimley (GB)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 0 days. days.

(21) Appl. No.: 15/105,304

(22) PCT Filed: Dec. 17, 2014

(86) PCT No.: PCT/IB2014/066987
§ 371 (c)(1),
(2) Date: Jun. 16, 2016

(87) PCT Pub. No.: WO2015/092691
PCT Pub. Date: Jun. 25, 2015

(65) Prior Publication Data
US 2016/0328937 A1    Nov. 10, 2016

Related U.S. Application Data

(60) Provisional application No. 61/916,917, filed on Dec. 17, 2013.

(51) Int. Cl.
G08B 29/18    (2006.01)
G08B 17/12    (2006.01)
(Continued)

(52) U.S. Cl.
CPC ............ *G08B 17/125* (2013.01); *A62C 37/36* (2013.01); *B05B 12/082* (2013.01); *B05B 12/12* (2013.01);
(Continued)

(58) Field of Classification Search
CPC ...... G08B 29/185; G08B 17/00; G08B 17/12; G08B 17/125
See application file for complete search history.

(56) References Cited

U.S. PATENT DOCUMENTS 4,149,159 A * 4/1979 Datwyler ............... G08B 17/00
340/522
4,195,286 A * 3/1980 Galvin ................... G08B 23/00
340/501
(Continued)

FOREIGN PATENT DOCUMENTS

EP    1103285 A1    5/2001
EP    1122700 A1    8/2001
(Continued)

OTHER PUBLICATIONS

Kaiser, T., "Fire Detection with Temperature Sensor Arrays," Security Technology, 2000. Proceedings, IEEE 34th Annual International Conference, Oct. 23, 2000, pp. 262-268.
(Continued)

*Primary Examiner* — Andrew Bee
(74) *Attorney, Agent, or Firm* — HoustonHogle LLP

(57) ABSTRACT

A fire detection system includes at least two fire detectors having a partially overlapping view of a fire. The at least two fire detectors are configured to acquire fire cluster information related to the fire. A validation and pairing module pairs fire clusters detected by the at least two fire detectors for the fire. The validation and pairing module is configured to validate the paired fire clusters according to a validation
(Continued)

process that ensures that the pair corresponds to a fire. A triangulation module determines a three-dimensional fire location for the fire based on the fire cluster information related to the validated fire cluster pairs.

16 Claims, 21 Drawing Sheets

(51) Int. Cl.

| | | |
|---|---|---|
| A62C 37/36 | (2006.01) | |
| B05B 12/08 | (2006.01) | |
| B05B 12/12 | (2006.01) | |
| G01J 5/00 | (2006.01) | |
| G01P 5/00 | (2006.01) | |
| G01P 13/00 | (2006.01) | |

(52) U.S. Cl.
CPC ............ *G01J 5/0018* (2013.01); *G01P 5/00* (2013.01); *G01P 13/0006* (2013.01); *G08B 29/185* (2013.01)

(56) References Cited

U.S. PATENT DOCUMENTS

| | | | | |
|---|---|---|---|---|
| 4,749,862 | A * | 6/1988 | Yoshida | G08B 26/00 250/342 |
| 4,821,805 | A | 4/1989 | Saito et al. | |
| 4,909,329 | A | 3/1990 | Yoshida et al. | |
| 5,165,482 | A | 11/1992 | Smagac et al. | |
| 6,267,539 | B1 | 7/2001 | Mihalcin | |
| 6,819,237 | B2 | 11/2004 | Wilson et al. | |
| 8,714,466 | B2 | 5/2014 | Trapp et al. | |
| 9,449,240 | B2 * | 9/2016 | Lorenzoni | G08B 17/125 |
| 2002/0026431 | A1 | 2/2002 | Pedersen et al. | |
| 2004/0089735 | A1 | 5/2004 | Drechsel | |
| 2004/0163827 | A1 | 8/2004 | Privalov et al. | |
| 2009/0101368 | A1 | 4/2009 | Lozier | |
| 2010/0117839 | A1 | 5/2010 | Lee | |
| 2011/0155397 | A1 * | 6/2011 | Icove | G01K 11/006 169/43 |
| 2012/0001760 | A1 | 1/2012 | Harchanko | |
| 2012/0314066 | A1 | 12/2012 | Lee et al. | |
| 2013/0106312 | A1 | 5/2013 | Beardsley et al. | |
| 2014/0028803 | A1 * | 1/2014 | Hanses | H04N 13/0282 348/47 |
| 2014/0334674 | A1 | 11/2014 | Lorenzoni | |
| 2016/0321900 | A1 | 11/2016 | Rao et al. | |
| 2016/0328938 | A1 | 11/2016 | Rao et al. | |

FOREIGN PATENT DOCUMENTS

| | | |
|---|---|---|
| EP | 2264677 A1 | 12/2010 |
| JP | H05266373 A | 10/1993 |
| WO | 02081031 A2 | 10/2002 |

OTHER PUBLICATIONS

Munoz, M. et al., "Analysis of the geometric and radiative characteristics of hydrocarbon pool fires," Combustion and Flame, vol. 139, No. 3, Nov. 14, 2004, pp. 263-277.

Ukil, A., et al., "Distributed Temperature Sensing: Review of Technology and Applications," IEEE Sensors Journal, vol. 12, No. 5, May 2012, pp. 885-892.

Xia, D., et al., "A Method Research on Fire Source Localization Using Dual-Line Gas Sensor Array," Intelligent Control and Automation, 2008. Proceedings of the 7th World Congress on Intelligent Control and Automation, Jun. 25-27, 2008, pp. 5862-5865.

International Search Report and Written Opinion of the International Searching Authority, dated Mar. 5, 2015, from International Application No. PCT/IB2014/066987, filed Dec. 17, 2014. Eleven pages.

International Search Report and Written Opinion of the International Searching Authority, dated Mar. 3, 2015, from International Application No. PCT/IB2014/066988, filed Dec. 17, 2014. Sixteen pages.

International Search Report and Written Opinion of the International Searching Authority, dated Mar. 12, 2015, from International Application No. PCT/IB2014/066989, filed Dec. 17, 2014. Twenty-two pages.

Glockling, J. et al., "Development of a robotic local suppression system for the marine environment," Proceedings of the National Fire Protection Association Suppression and Detection Research and Applications Conference, Mar. 2008. Thirteen pages.

Glockling, J. et al., "Shipboard Intelligent Fire Suppression Systems," Proceedings of the National Fire Protection Association Suppression and Detection Research and Applications Conference, Mar. 2007. Thirteen pages.

Infra-Red Flame Detection, Flame Vision FV 300 User Manual, UM 35, Issue 3, 120-415-886,Tyco Safety Products, copyright 2008 Thorn Security Ltd. Sixty-eight pages.

International Preliminary Report on Patentability, dated Jun. 30, 2016, from International Application No. PCT/IB2014/066987, filed on Dec. 17, 2014. Nine pages.

International Preliminary Report on Patentability, dated Jun. 30, 2016, from International Application No. PCT/IB2014/066988, filed on Dec. 17, 2014. Fourteen pages.

International Preliminary Report on Patentability, dated Jun. 30, 2016, from International Application No. PCT/IB2014/066989, filed on Dec. 17, 2014. Twenty pages.

* cited by examiner

X : Pixel offset between ideal as per geometry vs. actual

SYSTEM AND METHOD FOR DETECTING FIRE LOCATION

RELATED APPLICATIONS

This application is a § 371 National Phase Application of International Application No. PCT/IB2014/066987, filed Dec. 17, 2014, which claims the benefit under 35 USC 119(e) of U.S. Provisional Application No. 61/916,917, filed on Dec. 17, 2013, both of which are incorporated herein by reference in their entirety.

This application is related to U.S. application Ser. No. 15/105,308 filed on an even date herewith, and having the same inventors, entitled "System and Method for Monitoring and Suppressing Fire", now U.S. Patent Publication No. US 2016/0321900 A1, and U.S. application Ser. No. 15/105,311 filed on an even date herewith, and having the same inventors, entitled "System and Method for Detecting and Suppressing Fire Using Wind information", now U.S. Patent Publication No. US 2016/0328938 A1, all of which are incorporated herein by reference in their entirety.

BACKGROUND OF THE INVENTION

The hazardous industry sector including oil & gas, alcohol, paper, wood, coal, plastic etc. inherently is engaged in handling highly inflammable substances in both indoor and outdoor conditions. The fires involving these substances have a tendency to spread fast and get out of control very quickly, causing enormous damage to life and property. There is ever increasing demand to enhance the safety of personnel and valuable assets from accidental fires.

Early and reliable detection of fires can be effective in controlling the spread of fire. For example, the FLAMEVision FV300 flame/fire detector can reliably detect fires as fire clusters with practically no false alarms. The FV300 or other video-based sensor systems (hence forth collectively referred to as spatially resolved fire detectors) provide an indication of the detected fire on (a planar) two-dimensional (2D) reference system. The fire detectors can output data which represent the center of the fire cluster as well as size of the fire cluster to thereby provide fire location information in the 2D plane of the sensor array.

Combining two-dimensional fire cluster center data from at least two fire detectors which have a common field of view of a fire can produce depth information which can be used to calculate a fire location on a three-dimensional grid. The estimated position of the fire can be used by control systems which can drive suppression devices (e.g., monitors) to deploy water/foam jets towards the fire.

SUMMARY OF THE INVENTION

The proposed invention provides solutions to several practical problems which impact the accuracy of locating the fire position. These problems could be due, for example, to inherent limitations of the fire detectors in accurately outputting the fire locations due to ambiguity in pairing fire cluster information from multiple spatially resolved fire detectors. Specifically a number of different validation approaches can be used together or separately to improve the confidence that fire cluster information from multiple detectors is properly attributed to the same fire.

In general, according to one aspect, the invention features a fire detection system. This system comprises at least two spatially resolved fire detectors having at least a partially overlapping field of view of a protected area to generate fire cluster information, e.g., a fire cluster center, a fire cluster size, and/or an alarm status of the fire cluster, for the protected area. A system controller then receives the fire cluster information from the fire detectors and pairs fire clusters detected by the at least two fire detectors and validates the pairs of fire clusters as representing a fire.

In embodiments, a preprocessor module is provided for averaging the acquired fire cluster information over time prior to the validation process.

Preferably each fire detector comprises a two-dimensional infrared sensor array and the system controller then determines a three-dimensional fire location for validated fire cluster pairs.

A number of different approaches can be used together or separately to validate the pairs of fire clusters.

In one example, the system controller validates fire cluster pairs based on the geometry of the placement of the fire detectors when two fires may arise along the same line of sight for one of the fire detectors.

The system controller can also validate fire cluster pairs based on regions of interest for each of the fire detectors by validating fire cluster pairs when they occur in matching regions of interest for the two fire detectors.

The system controller cam validate fire cluster pairs derived from two fire detectors by reference to fire cluster information from additional fire detectors.

The system controller can further or alternatively validate fire cluster pairs based on time cluster detection epochs by determining whether a time interval between the detection of the fire clusters by two fire detectors is less than a threshold value.

In general, according to one aspect, the invention features a fire detection method. The method comprises generating fire cluster information with at least two spatially resolved fire detectors having at least a partially overlapping field of view of a protected area, receiving the fire cluster information from the fire detectors and pairing fire clusters detected by at least two fire detectors, and validating the pairs of fire clusters as representing a fire.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof Further, it will be understood that when an element, including component or subsystem, is referred to and/or shown as being connected or coupled to another element, it can be directly connected or coupled to the other element or intervening elements may be present.

There are existing products which provide fire location coordinates to direct a suppression device (e.g., fog/jet monitor) towards a direction of fire. However, the improvements on accuracy and robustness of the output fire location coordinates under various conditions have not been realized. In general, the accuracy and reliability of the fire location output provided by the fire detection system depends on a number of known factors such as the inherent sensor characteristics (sensor resolution, range, response times, intensity (size) of fire etc.), relative orientations of multiple fire detectors, and the extent of common or overlapping field of view shared by various fire detectors. Prior systems inadequately specify how the possible location errors due to above factors could be mitigated.

Embodiments of the invention improve the fire location estimation accuracy by a number of processing steps which help in increasing accuracy of reported fire locations and compensating for any residual errors in sensor outputs.

Figure 1:
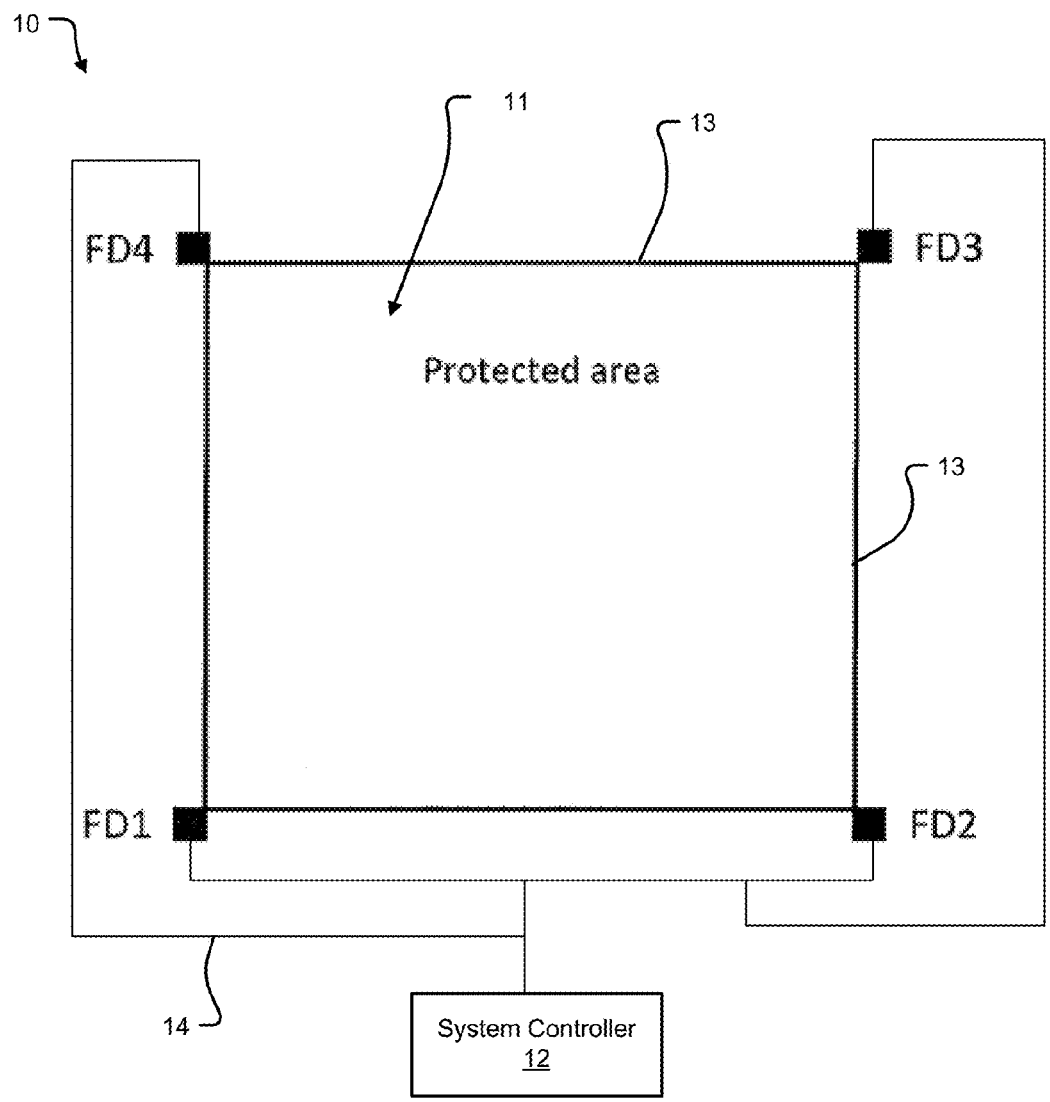
FIG. 1 is a schematic drawing of a fire detection system monitoring a protected area.

A reference layout of a fire detection system 10 is shown in FIG. 1.

The fire detection system 10 is installed around a perimeter 13 surrounding a protected area 11. The fire detection system 10 includes fire detectors FD positioned along the perimeter 13 of the protected area 11 to monitor this protected area 11 for fires. In this illustrated example, four fire detectors FD1-FD4 surround the protected area 11. The fire detectors are spatially resolved in that they can determine the location of the fires within their field of views.

The fire detection system 10 further includes a fire detector network 14. The fire detector network 14 allows for communication between the fire detectors FD1-FD4 and a system controller 12 In particular, the system controller 12 receives fire cluster information related to a fire from the fire detectors FD1-FD4 via the fire detector network 14.

Figure 2:
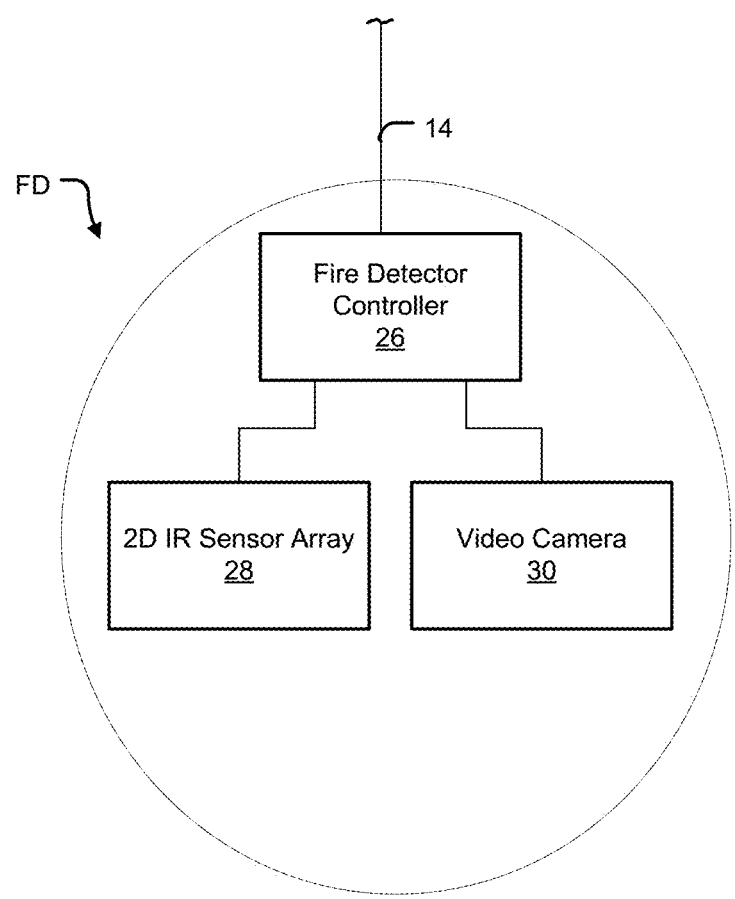
FIG. 2 is a block diagram of a fire detector.

As shown in FIG. 2, each of the fire detectors FD includes two main components: a fire detector controller 26, and a two-dimensional (2D) infrared (IR) sensor array 28. A video camera 30 is further included in some embodiments. The fire detectors spatial resolution derives from their 2D detection capability based on the sensor array and/or the video camera.

The fire detectors FD are each capable of detecting fire based on specific sensing technologies such as infrared, thermal video, or a combination of these technologies. The fire detectors FD use the 2D IR sensor array 28 to detect fire using infrared technology. In particular, the fire detectors FD output the fire cluster information based on the response of the 2D IR sensor array 28. The group of sensors, i.e., pixels, on the 2D IR array that represent the detected fire are termed a fire cluster. This fire cluster information includes parameters related to a detected fire with reference to a 2D pixel array such as the center of the fire cluster within the 2D IR sensor array 28 and the size of the fire cluster being the number of sensors within the array that are in an alarm state, i.e., detecting IR radiation levels that exceed an alarm threshold.

The video camera 30 output is used to high-light the region of interest (detected fire) using suitable graphics overlay based on the fire cluster information.

Figure 3A:
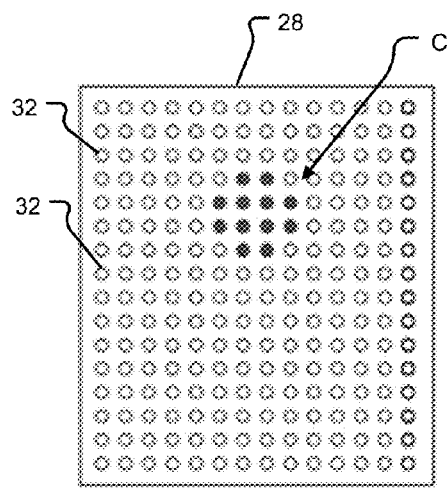
FIGS. 3A and 3B are schematic drawings of a two-dimensional infrared (IR) sensor array showing fire clusters.
Figure 3B:
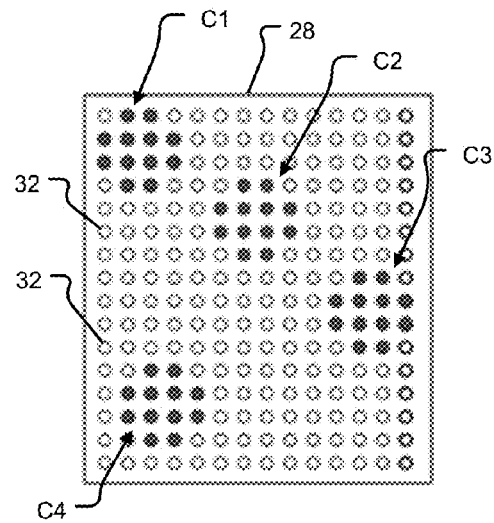
Figure 3C:
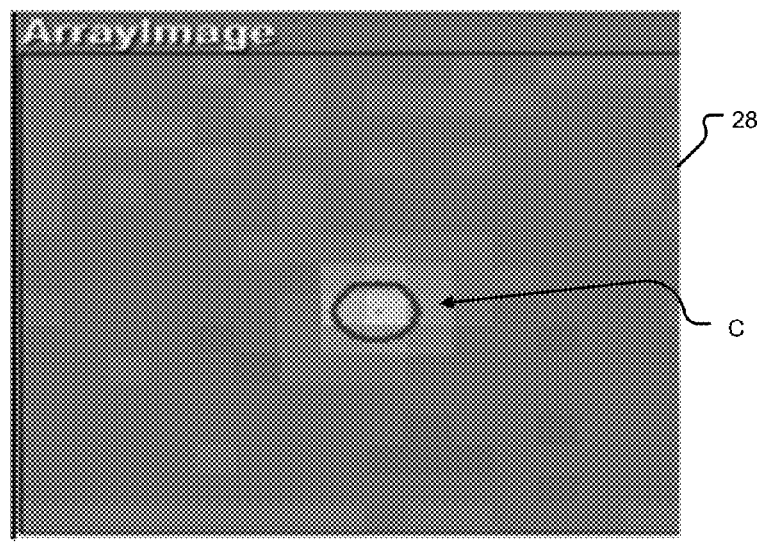
FIG. 3C is a false color IR image from the sensor array.

As shown in FIGS. 3A-3C, the IR sensor array 28 includes multiple IR sensors 32 that detect fire clusters C. In one particular example, the 2D IR sensor array 28 includes a 16 by 16 array of IR sensors 32 (e.g., highly sensitive pyro electric sensors) that detect if infrared light is of sufficient intensity and form to be indicative of a fire by reference to an alarm threshold. FIG. 3A illustrates a 2D IR sensor array 28 detecting one active fire cluster C and FIG. 3B illustrates a 2D IR sensor array 28 detecting multiple active fire clusters C1-C4.

FIG. 3C shows a coarse resolution IR image generated by the sensor array 28. It shows a single fire cluster C.

The fire cluster(s) C detected by the 2D IR sensor array 28 is (are) used in generating 2D fire location data for each fire giving rise to a fire cluster. Each fire detector FD outputs this fire cluster information, which includes fire cluster center, fire cluster size, and fire cluster alarm status information.

Figure 4:
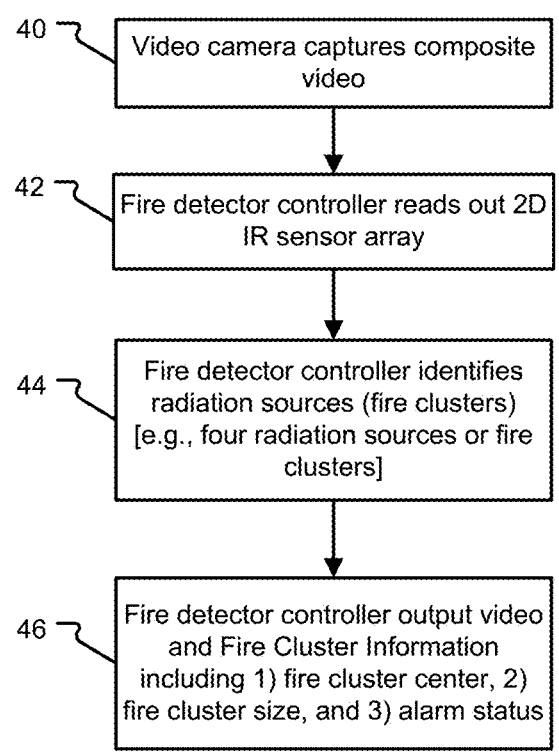
FIG. 4 is a flowchart illustrating the steps performed by the fire detector to detect a fire.

Each fire detector FD generates fire cluster information using the process shown in FIG. 4. In step 40, the video camera 30 captures composite video. Then, in step 42, the fire detector controller 26 reads out the 2D IR sensor array 28. The fire detector controller 26 identifies radiation sources (i.e., fire clusters) (step 44) by comparing each sensor response to an alarm threshold. In step 46, the fire detector controller 26 outputs video and fire cluster information including 1) fire cluster center, 2) fire cluster size, and 3) alarm status, which are sent to the controller 12 over the network 14.

Figure 5:
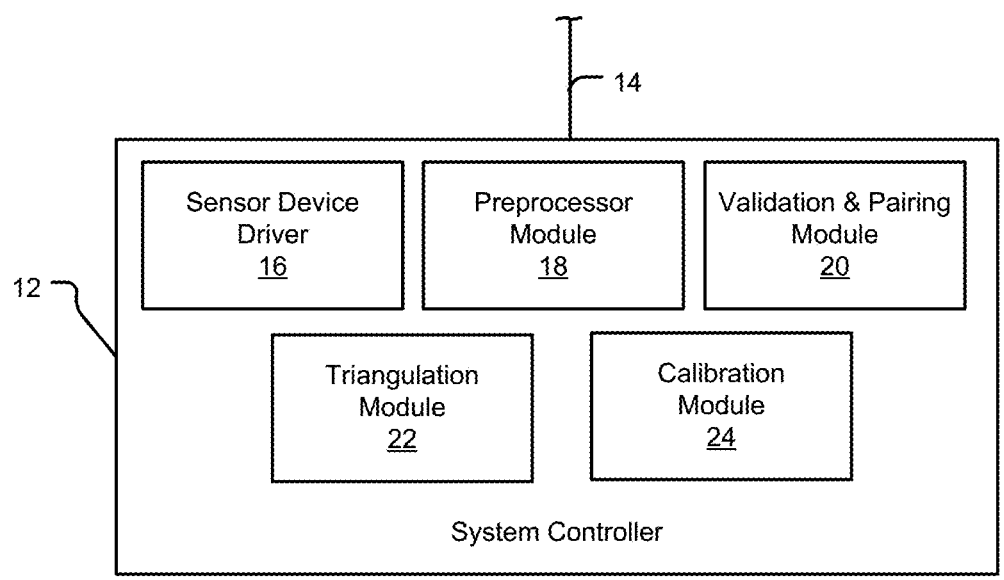
FIG. 5 is a block diagram of a system controller including functional components for implementing the fire detection process.

The system controller 12 includes a number of functional components shown in the FIG. 5 block diagram. The functional components include: a sensor device driver 16, a preprocessor module 18, a validation & pairing module 20, a triangulation module 22, and a calibration module 24.

The sensor device driver 16 provides an interface for receiving information and data from the fire detectors FD1-FD4. In particular, the sensor device driver 16 provides the function of interfacing with each fire detector FD via the fire detector network 14.

Figure 6:
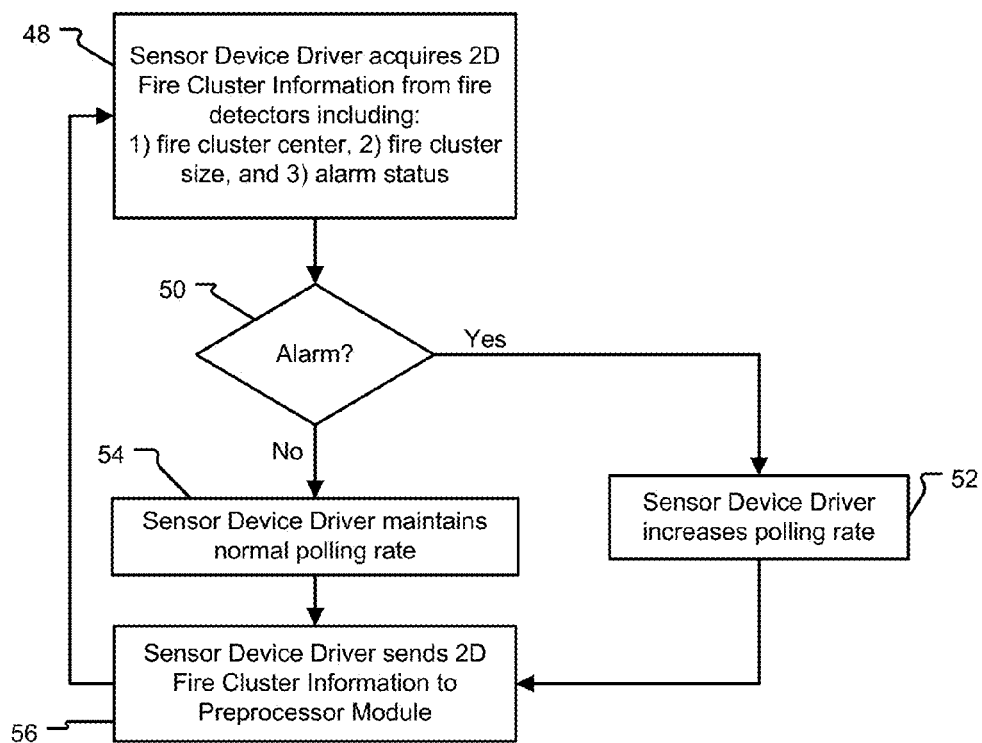
FIG. 6 is a flowchart illustrating the steps performed by a device driver of the system controller.

As shown in FIG. 6, the sensor device driver 16 acquires the 2D fire cluster information (fire cluster center, fire cluster size, and alarm status) from the fire detectors FD (step 48). In step 50, the sensor device driver 16 detects if there is an alarm condition in the fire cluster information. If an alarm condition is detected, the polling rate is increased to acquire fire cluster information (e.g., 2D fire location samples) more frequently from the fire detectors FD (step 52). Otherwise, if no alarm is detected, the sensor device driver 16 maintains a normal polling rate (step 54). At step 56, the sensor device driver 16 sends the received 2D fire cluster information to the preprocessor module 18.

Figure 7:
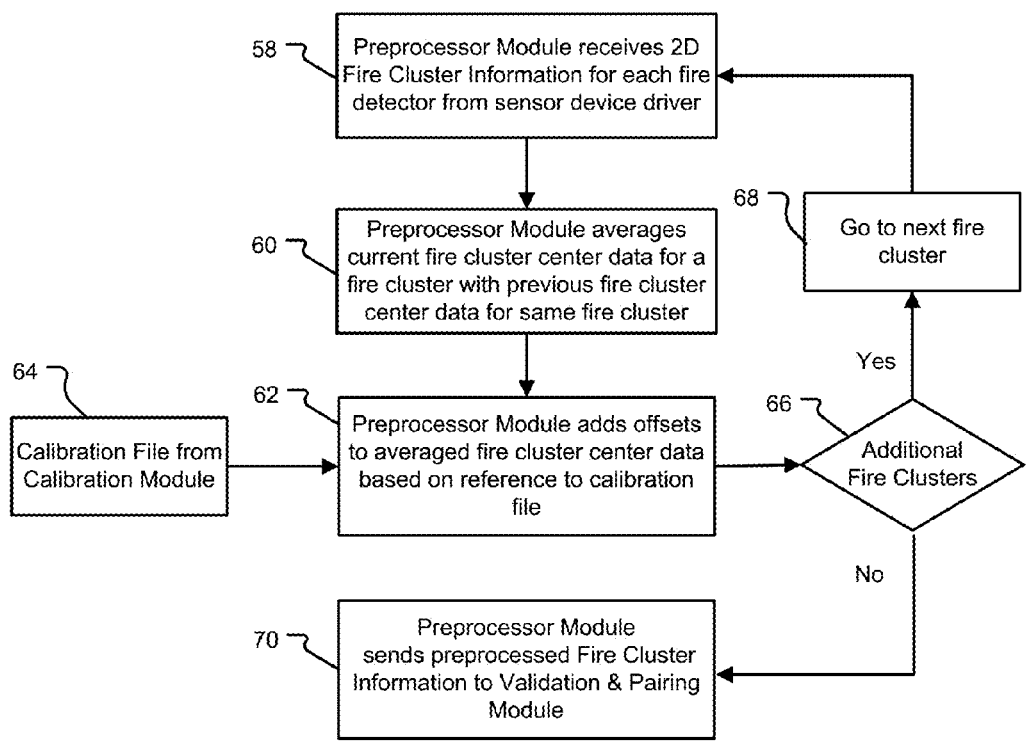
FIG. 7 is a flowchart illustrating the steps performed by a preprocessor module of the system controller.

As shown in FIG. 7, the preprocessor module 18 receives 2D fire cluster information for each fire detector FD from the sensor device driver 16 (step 58). In step 60, the preprocessor module 18 averages current fire cluster center data for a fire cluster C with previous fire cluster center data for the same fire cluster C. In one implementation, the preprocessor module 18 averages fire location data over configurable time windows in order to reduce the effects of wind-induced noise in the cluster center information. In step 62, the preprocessor module 18 adds offsets to averaged fire cluster center data based on reference to a calibration file. The calibration file is received by the preprocessor module 18 from the calibration module 24 (step 64). In particular, these offsets may be derived, for example, from a calibration or sensor alignment process which is undertaken on standalone fire detectors FD or during installation.

In step 66, the preprocessor module 18 determines if there are additional fire clusters C. If there are additional fire clusters C, the next fire cluster C is run through steps 58-62 of the preprocessor module 18 (step 68). If there are no additional fire clusters C, the preprocessor module 18 sends the preprocessed fire cluster information to the validation & pairing module 20.

Figure 8:
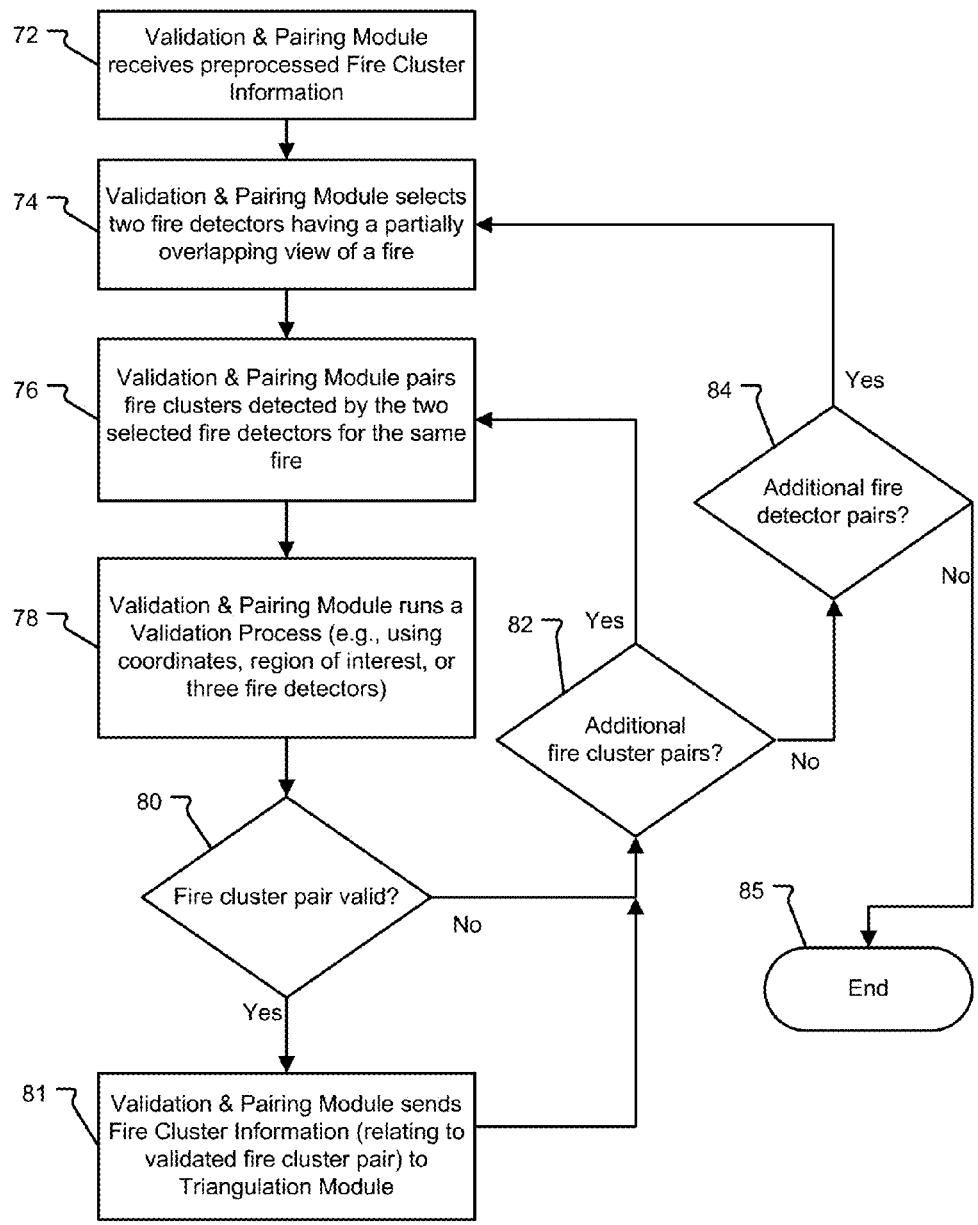
FIG. 8 is a flowchart illustrating the steps performed by a validation & pairing module of the system controller.

As shown in FIG. 8, the validation & pairing module 20 receives the preprocessed fire cluster information in step 72. In step 74, the validation & pairing module 20 selects two fire detectors FD1, FD2 as having a partially overlapping view 15 of a Fire (see FIG. 9). This partially overlapping view 15 (i.e., common field of view) is based on overlap between the field of view FOV-1 of the first fire detector FD1 and the field of view FOV-2 of the second fire detector FD2. The validation & pairing module 20 pairs fire clusters C detected by the two selected fire detectors FD1, FD2 for the same fire (step 76). In step 78, the validation & pairing module 20 runs a validation process (e.g., using coordinates, region of interest, or three fire detectors). The validation process 78 is utilized to consistently pair fire clusters C that represent a unique fire.

The validation process 78 ensures that only consistently paired fire cluster data is further passed along to a triangulation algorithm of the triangulation module 22. Based on the validation process 78, the fire cluster pair is either valid or invalid (step 80). The validation & pairing module 20 then determines, at step 82, if there are additional fire cluster pairs and if so steps 76 and 78 are repeated for the new pair. If there are no additional fire cluster pairs, the validation & pairing module 20 determines if there are additional fire detector pairs at step 84 and if so steps are repeated to validate fire cluster pairs for the new fire detector pair. Otherwise, the process ends at step 85. If the fire cluster pair is valid, the validation & pairing module 20 sends the fire cluster information (relating to validated fire cluster pair) to the triangulation module 22.

Figure 9:
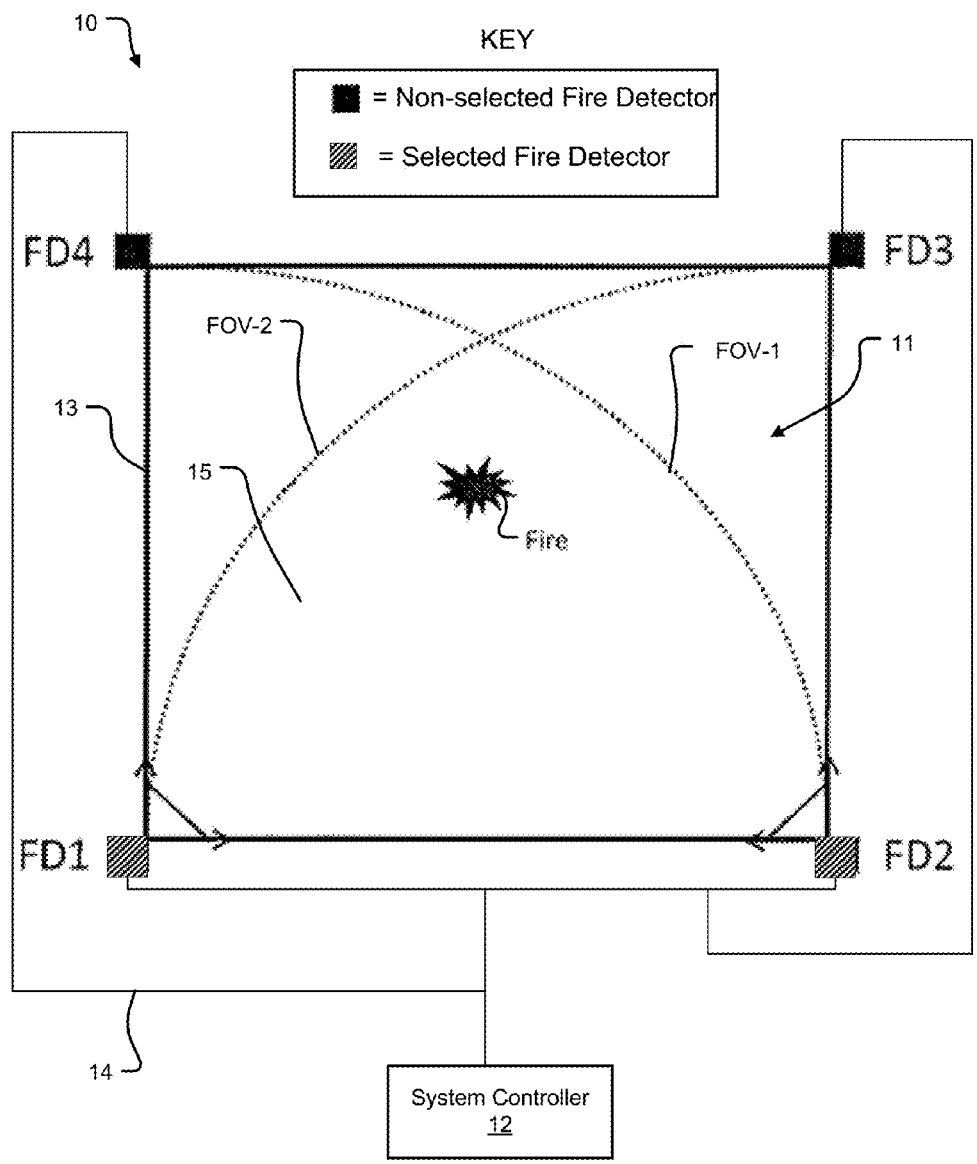
FIG. 9 is a schematic drawing of the fire detection system including two fire detectors having a partially overlapping view (i.e., common field of view) of a fire.

In one example, the validation of fire cluster pair relies on sensor placement geometry. A pair of fire detectors FD1, FD2 is involved along with a triangulation algorithm to compute the fire location when the fire occurs in their partially overlapping view 15 (i.e., common field of view). This partially overlapping view 15 or common field of view is between the first fire detector's field of view FOV-1 and the second fire detector's field of view FOV-2 as shown in the example of FIG. 9. The triangulation algorithm of the triangulation module 22 uses a pair of fire clusters C as input, each of which appear in the individual fire detectors FD1, FD2 of the detectors pair.

The validation and pairing module ensures that this input fire cluster pair corresponds to a unique fire. Otherwise, the incorrect pairing of fire clusters C leads to improper computation of a fire location. Therefore, the pair of fire clusters needs to be validated prior to input to the triangulation module 22.

Figure 10A:
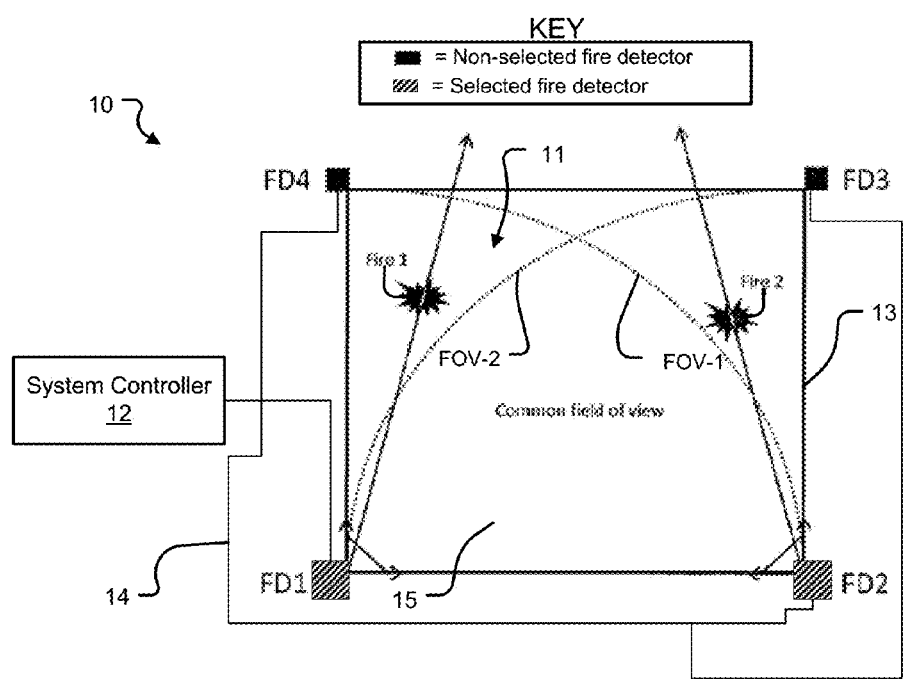
FIGS. 10A-10C are schematic drawings of the fire detection system impacted by the phenomena of fire cluster discrepancy, fire cluster center offset, and ambiguity in pairing fire clusters.

Some of the likely phenomena that may cause the incorrect pairing of the fire clusters C are cluster discrepancy (FIG. 10A), cluster center offset (FIG. 10B), and cluster enumeration ambiguity (FIG. 10C), which are described below.

In case of multiple fires (Fire 1 and Fire 2) and when all fires are not detected by both fire detectors FD1, FD2, then a pair of fire clusters reported by the fire detectors FD1, FD2 may not refer to the same fire. For example, the first fire detector FD1 refers to Fire 1 and the second fire detector FD2 refers to Fire 2 as in FIG. 10A. This is termed as the cluster discrepancy for the triangulation algorithm. If such fire clusters C are paired and processed by the triangulation algorithm, it results in the triangulation algorithm locating a phantom fire. The cluster discrepancy may be more obvious in case of small fires and in case of fires that are not visible by both fire detectors FD1, FD2.

Figure 10B:
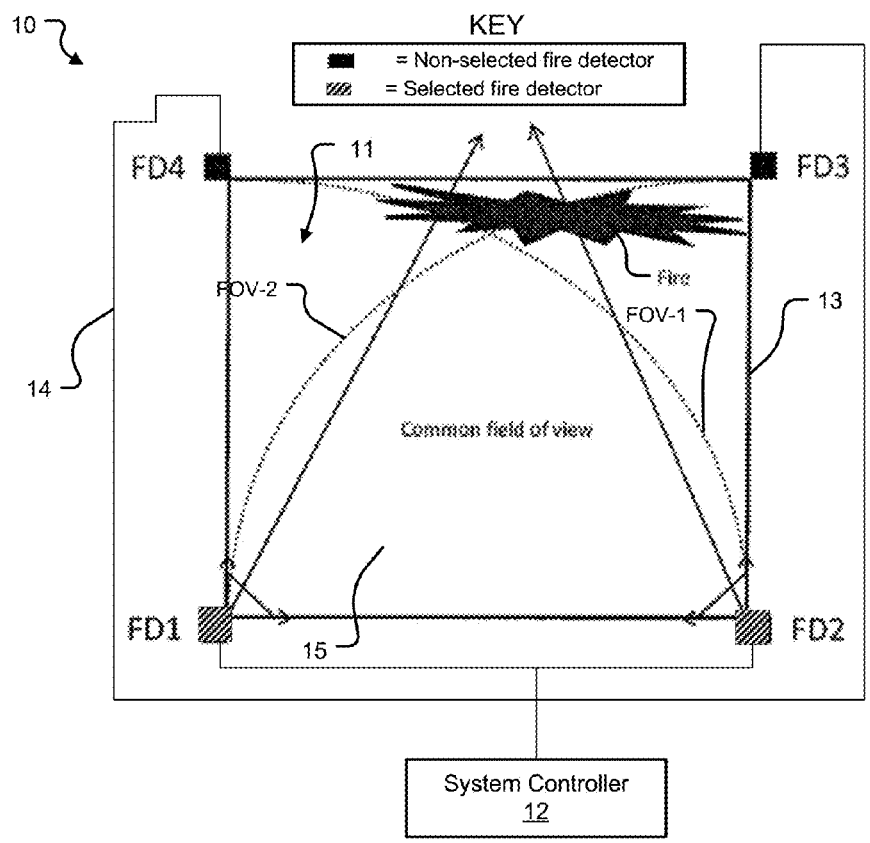

In case of a large fire, each of the fire detectors FD1, FD2 may not have complete visibility of the fire as shown in FIG. 10B. In such cases, fire detectors FD1 and FD2 may output cluster centers that are not truly representative of the center of the fire. Consequently, the reported cluster centers will have an associated error.

Figure 10C:
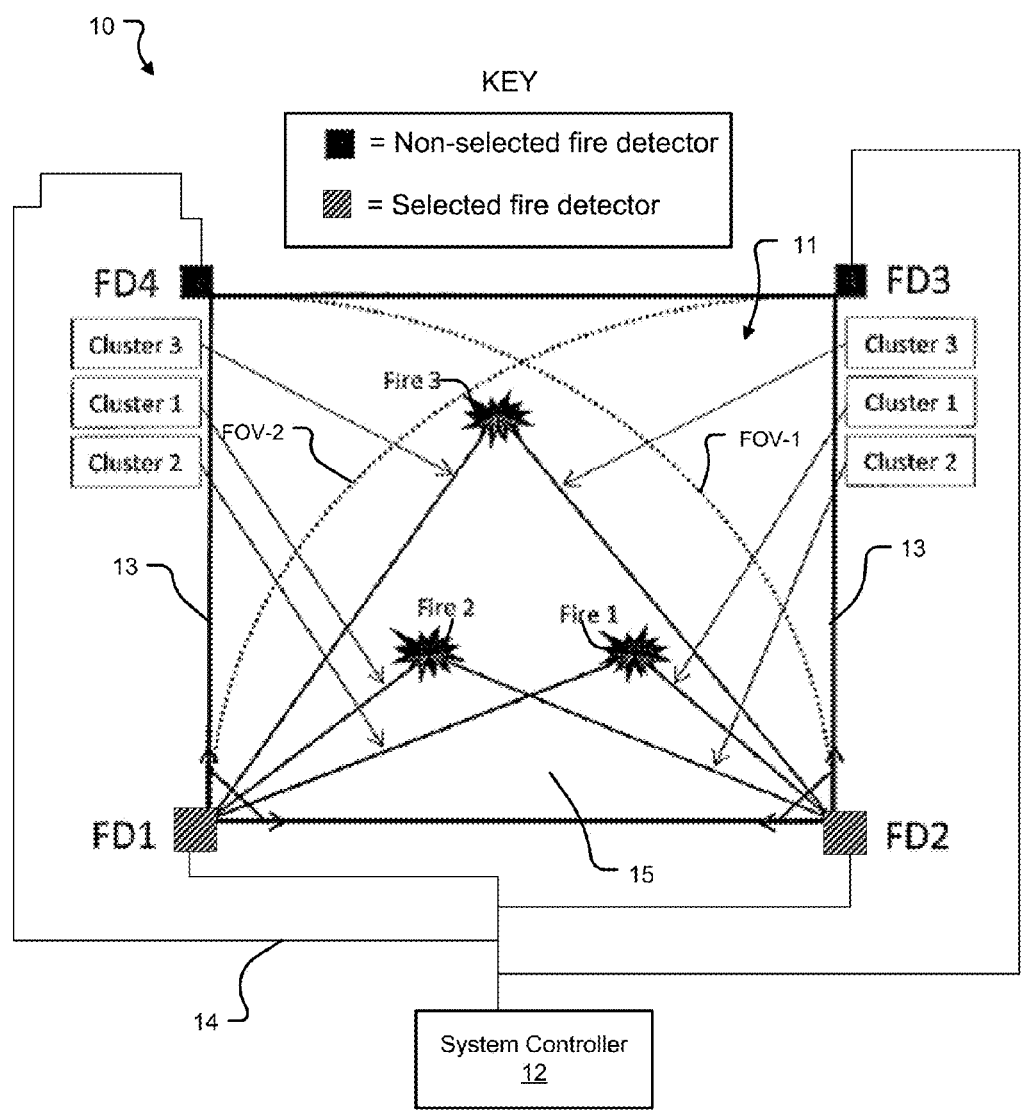

In case of multiple fires (Fire 1, Fire 2, and Fire 3) and when multiple fire clusters (fire clusters 1, 2, and 3) are reported by the fire detectors FD1, FD2, there may be cluster enumeration ambiguity. The enumeration order of the fire clusters 1-3 for the fire sources (Fires 1-3) might be different in different fire detectors FD. For example, the fire reported by cluster 1 of the first fire detector FD1 may not be the same fire reported by cluster 1 of the second fire detector FD2. FIG. 10C illustrates Fire 1 as represented by cluster 2 on the first fire detector FD1 and dusted on the second fire detector FD2. Fire 2 is represented by cluster 1 on the first fire detector FD1 and cluster 2 on the second fire detector FD2. Fire 3 is represented by cluster 3 on the first fire detector FD1 and cluster 3 on the second fire detector FD2. The reasons for different enumeration of the same fire in different fire detectors FD1, FD2 are—distance of fire from fire detectors FD1, FD2, difference in perceived fire intensity, and fields of view FOV-1, FOV-2 of the fire detectors FD1, FD2. This ambiguity is termed as cluster enumeration ambiguity.

The following validation process 78 is applied to each fire cluster pair to ensure that the fire cluster pair refers to the same fire.

Figure 11:
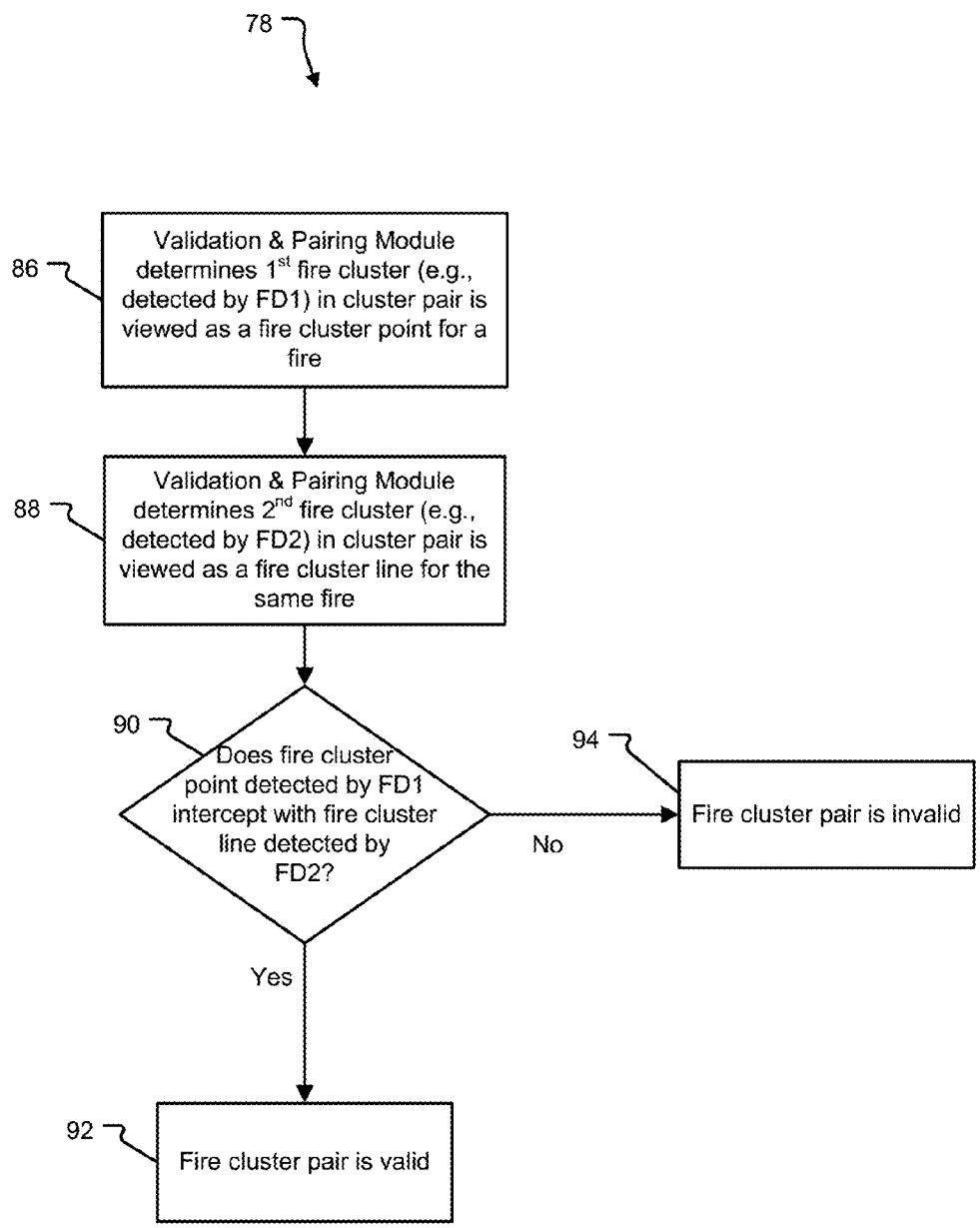
FIG. 11 is a flowchart illustrating the steps performed by the validation & pairing module to implement a validation process using fire cluster coordinates.

One example validation process 78 uses sensor placement geometry. In one example, validation based on sensor placement geometry particularly uses fire cluster coordinates 37. Validation using fire cluster coordinates 37 is shown in FIG. 11 as well as FIGS. 12A-12B. A fire detector FD can detect a specific fire at a real world coordinate of (X, Y, Z), the Y component of that fire is linearly proportional to the distance between the fire detector FD and the fire. However, the fire detector FD may not be able to differentiate between two fires (Fire 1 and Fire 2) lying on an AB line 39 joining a fire cluster coordinate 37 and the fire (Fire 1 or Fire 2) because they are along the same line of sight for that fire detector. In step 86 of the validation process 78, the validation & pairing module 20 determines the first fire cluster (i.e., detected by the first fire detector FD1 in the fire cluster pair is viewed as a fire cluster point 36 having a fire cluster coordinate 37 for Fire 1 (i.e., cluster 1) or Fire 2 (i.e., cluster 2).

Figure 12A:
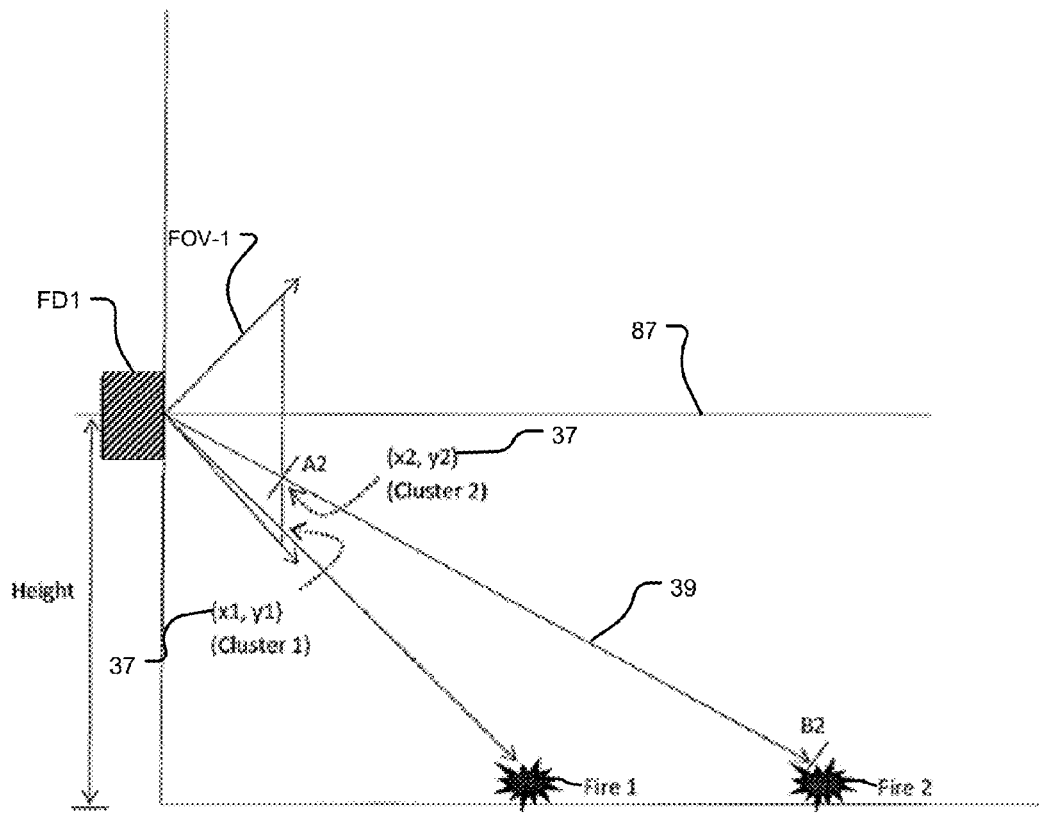
FIGS. 12A-12B are schematic drawings of the implementation of the validation process of FIG. 11 based on fire cluster coordinates for two fire clusters.
Figure 12B:
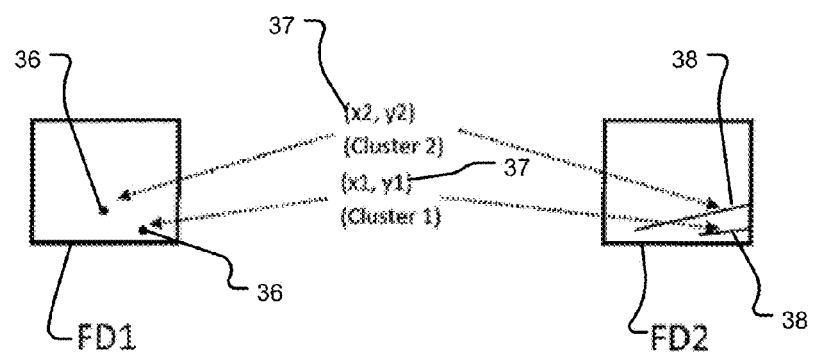

For example, as shown in FIGS. 12A-12B, Fire 2 is detected as having a fire cluster coordinate 37 of (x2, y2) on the first fire detector FD1 for cluster 2. In particular, the line 39 connecting A2 to B2 is seen as a point on the first fire detector FD1. In step 88, the validation & pairing module 20 determines a second fire cluster (e.g., detected by the second fire detector FD2) in the cluster pair is viewed as a fire cluster line 38 for the same fire (Fire 1 or Fire 2). In particular, the appropriately oriented second fire detector FD2 views the line 39 between A2 and B2 as a fire cluster line 38. The slope and intercept of the fire cluster line 38 in the second fire detector FD2 is defined by the fire cluster coordinate 37 for cluster 2 and also by the height and angle of the line of sight 87 for both fire detectors FD1, FD2. Therefore, when there are multiple fires (fire 1 and Fire 2) in the region, this line of sight 87 is used as a validation step in determining appropriate pairing of fire clusters between the first fire detector FD1 and the second fire detector FD2. Known techniques like projective geometry and camera modeling are also used to implement this validation process 78. At step 90, it is determined whether the fire cluster point 36 intercepts with the fire cluster line 38. If Yes, the fire cluster pair is valid (step 92) and if No, the fire cluster pair is invalid (step 94).

Figure 13:
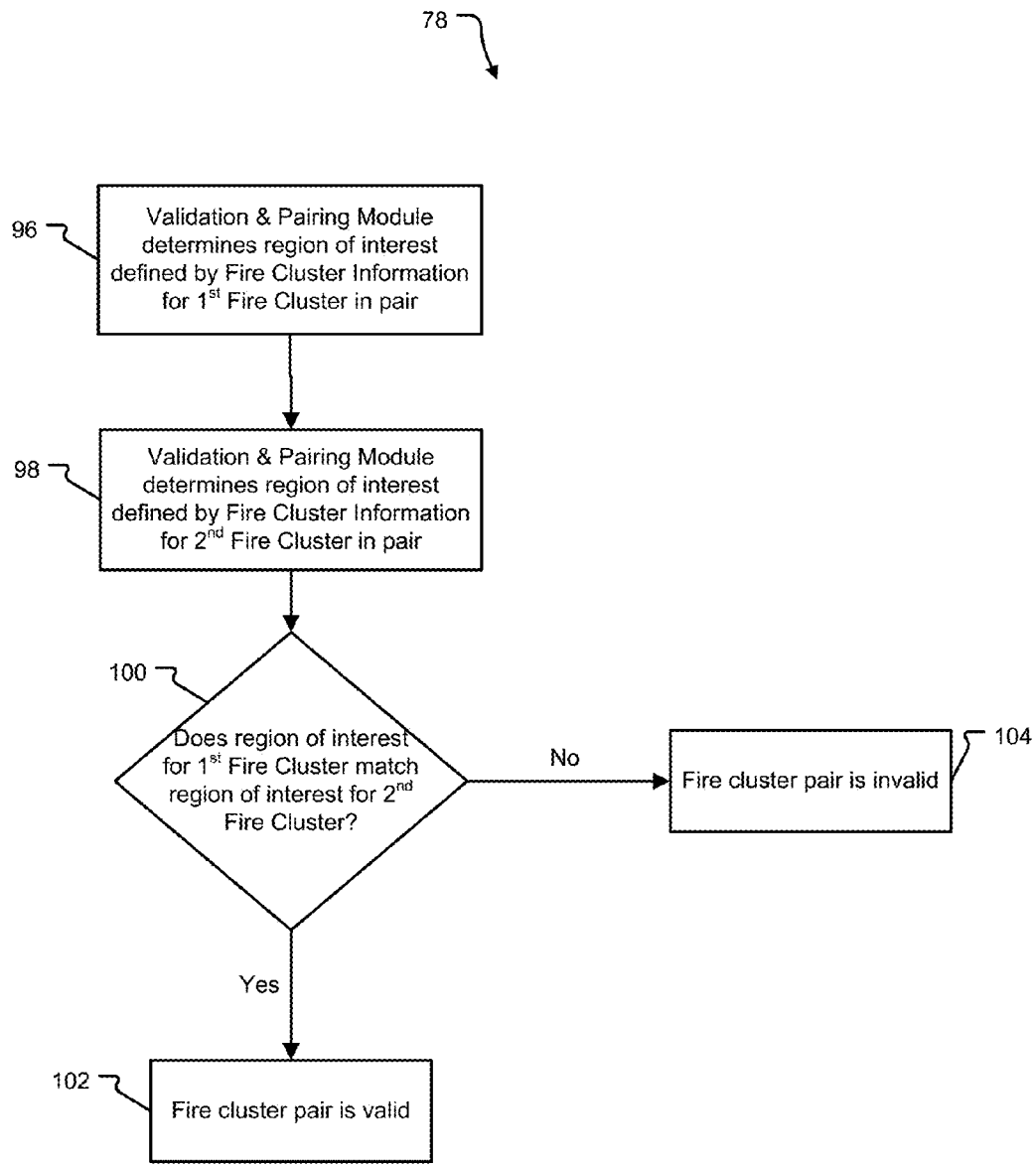
FIG. 13 is a flowchart illustrating the steps performed by the validation & pairing module for implementing a validation process using a region of interest (ROI) approach.

Another example validation process 78 uses sensor placement geometry but particularly uses regions of interest (ROI) instead of fire cluster coordinates 37. Validation using regions of interest (ROI) is shown in FIG. 13 as well as FIGS. 14A-14B. Validation and pairing based on a region of interest ROI and cluster size is used to resolve the cluster ordering ambiguity in case of multiple fires. This validation method can be applied independently or jointly with other methods.

Figure 14A:
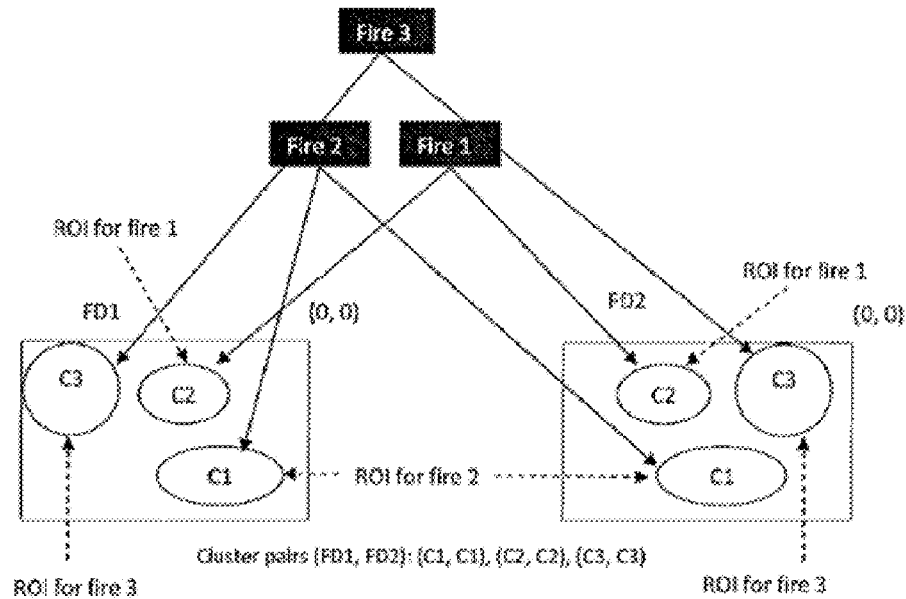
FIGS. 14A and 14B are schematic drawings of the implementation of the validation process of FIG. 13 based on the region of interest approach.

FIG. 14A illustrates fire clusters C1, C2, C3 each defining a distinct region of interest for Fire 1, Fire 2, and Fire 3, respectively. The ordered fire clusters C1, C2, C3 of the first fire detector FD1 consistently match the ordered fire clusters C1, C2, C3 of the second fire detector FD2 with Fire 2, Fire 1, and Fire 3 respectively.

Figure 14B:
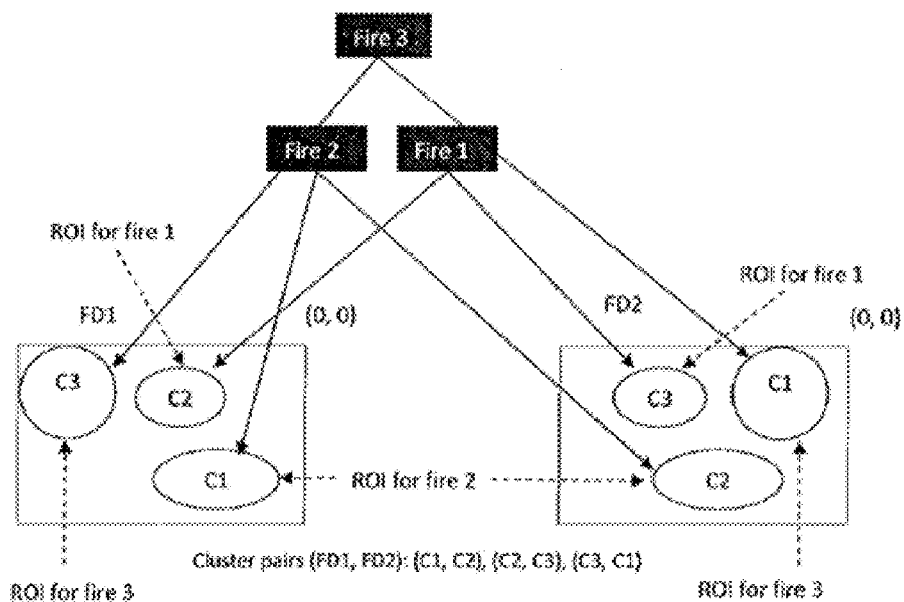

Referring to FIG. 14B, fire cluster C1 of the first and second fire detectors FD1, FD2 refers to Fire 2 and Fire 3 respectively and fire cluster C2 of first and second fire detectors FD1, FD2 refers to Fire 1 and Fire 2 respectively. In such a scenario, if fire start time is different and a pattern is generated based on the cluster center, cluster size, and region of interest (ROI) of clusters, the ambiguity in cluster pairing may be avoided. In particular, although the ordered fire clusters C1, C2, C3 do not match between the first fire detector FD1 and the second fire detector FD2, this validation process based on a region of interest ROI can resolve this ambiguity.

The validation process 78 of fire cluster pair using ROI is described below as illustrated in FIG. 13 and FIG. 14B.

In step 96, the validation & pairing module 20 determines region of interest defined by fire cluster information for first fire cluster C1 (detected by first fire detector FD1) in the pair. Then, in step 98, the validation & pairing module 20 determines region of interest defined by fire cluster information for second fire cluster C2 in the pair (detected by second fire detector FD2). In step 100, the validation & pairing module 20 determines if the region of interest for the first fire cluster C1 matches the region of interest for the second fire cluster C2. In this example, the fire cluster pair is valid (step 102). However, if fire cluster C1 of the second fire detector FD2 were compared with fire cluster C1 of the first fire detector FD1, the fire cluster pair would be deemed invalid (step 104).

This process of validating using a region of interest is further detailed below:

Input: The size of the 2D IR sensor array 28 used by the fire detectors FD1, FD2.
  Periodic samples of cluster information, a set of cluster center coordinates FD1C1 to FD1Cm for FD1 and FD2C1 to FD2Cn for FD2. The 'm' and 'n' may be either equal or unequal.
  The alarm status of the input clusters, either pre-alarm or alarm.
  The relative orientation of the paired fire detectors FD1, FD2 can be either parallel or perpendicular.
  The distance between the paired fire detectors FD1, FD2.

Process:
a. A first fire cluster C1 appeared in the first fire detector FD1 is used to identify the ROI for a second fire cluster C2 in the second fire detector FD2 based on fire cluster coordinates 37.
b. If there is a fire cluster C2 detected by the second fire detector FD2 inside the ROI of the first fire cluster C1 defined in "step a" then this second fire cluster C2 is paired with the first fire cluster C1 in the first fire detector FD1.
c. The ROI of the first fire cluster C1 in the first fire detector FD1 is considered as the corresponding ROI for the second fire cluster C2 in the second fire detector FD2.
d. The fire cluster pair in "step b" is considered a validated fire cluster pair.
e. The "step a" to "step d" are repeated for all fire clusters in FD1.
f. The ROIs in first and second fire detectors FD1, FD2 are remembered for consecutive validations of cluster pairs.

Output: Validated or invalidated cluster information.

This process can be described mathematically as follows:
1. M numbers of fire clusters C for the first fire detector FD1 and N numbers of fire clusters C for the second fire detector FD2 are acquired.
2. indices are initialized→i=1; j=1
3. FD1Ci determines region of interest (ROI) in second fire detector FD2 based on fire cluster coordinates 37
4. Is FD2Cj in ROI?
   4A. If Yes, FD1Ci and FD2Cj are valid pair of fire clusters C generated by unique fire and the validated fire clusters FD1Ci and FD2Cj are accumulated.
   4B. If No, j is incremented and then it is determined if j>N?
      4B1. If Yes, move onto step 5
      4B2. If No, step 4 is repeated
5. j=1 and i is incremented
6. i>M?
   6A. Yes, the process ends
   6B. No, step 3 is repeated.

Validation of fire cluster pairs can be performed based on inputs from a collection of three fire detectors. An alternative method to pair the fire clusters C which correspond to a unique fire is described here. in scenarios where there are three detectors FD1, FD2, FD3 which have partially overlapping view 15 (i.e., common field of view), triangulated fire locations are computed for all possible combinations of fire cluster data reported by two adjacent fire detectors (e.g., first fire detector FD1 and second fire detector FD2). The computation result is a list of fire locations from correctly paired clusters C which represent actual fires as well as phantom fire locations which do not represent any fire. The next pair of fire detectors (e.g., FD2, FD3) which has one fire detector from the previous computation is used to similarly generate a second list of fire locations. The set of common fire locations from the two lists above, represent actual fires and the corresponding clusters are deemed correctly paired.

This validation process 78 uses a collection of three fire detectors FD1, FD2, FD3. Validation using three fire detectors FD1, FD2, FD3 is shown in FIG. 15 as including the following steps:

In step 106, the validation & pairing module 20 selects a different third fire detector FD3 having a partially overlapping view 15 of a fire with respect to the paired fire detectors FD1, FD2. The validation & pairing module 20 selects fire cluster information related to a fire cluster C detected by the selected third fire detector FD3 for the same fire detected by the paired fire detectors FD1, FD2 (step 108). In step 110, the validation & pairing module 20 determines whether fire cluster information of third fire detector FD3 matches fire cluster information of the pair of fire clusters FD1, FD2, if it matches, the fire cluster pair is valid (step 112), otherwise the fire cluster pair is invalid (step 114).

Figure 15:
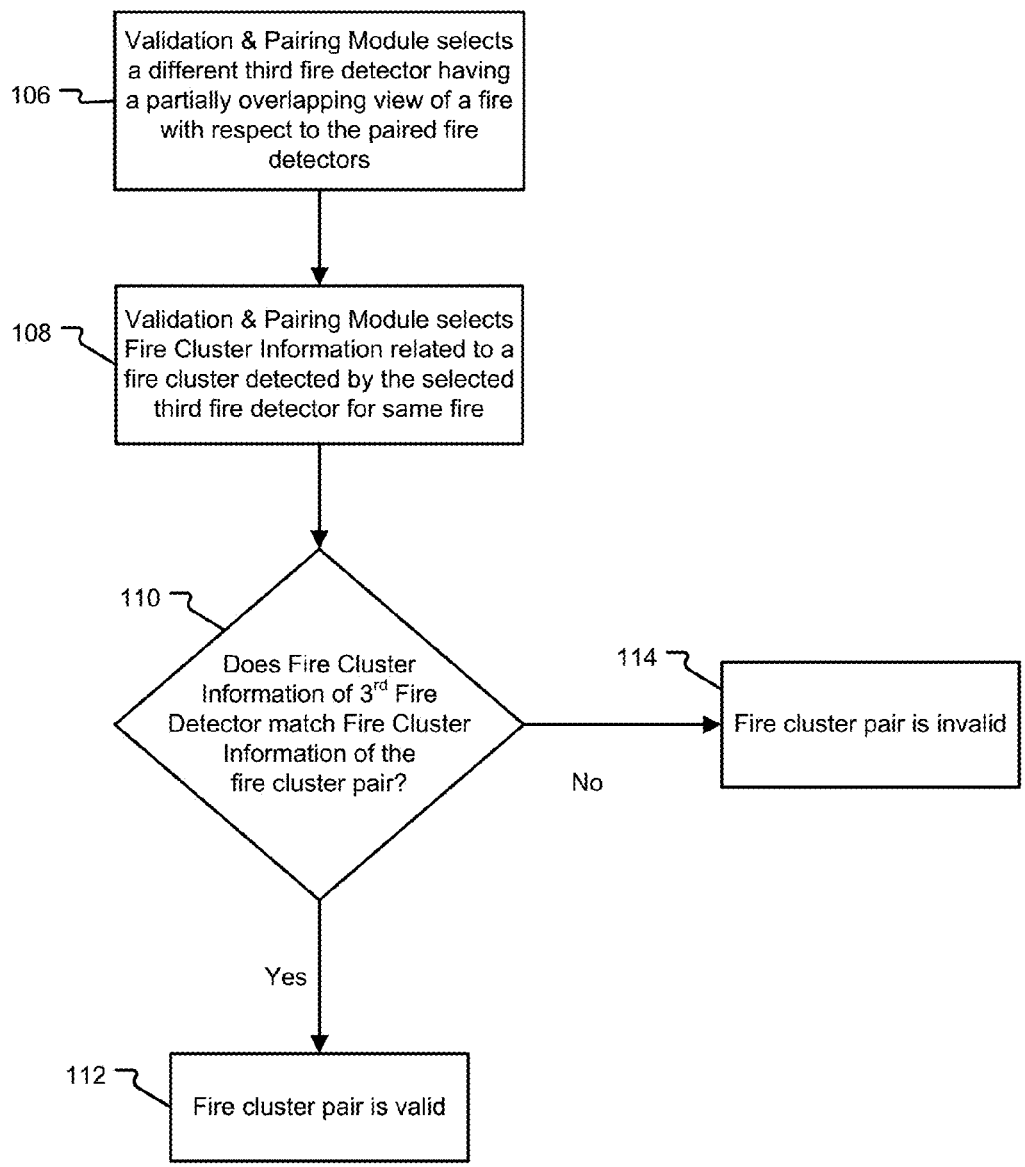
FIG. 15 is a flowchart illustrating the steps performed by the validation & pairing module for implementing a validation process using a third fire detector.
Figure 16:
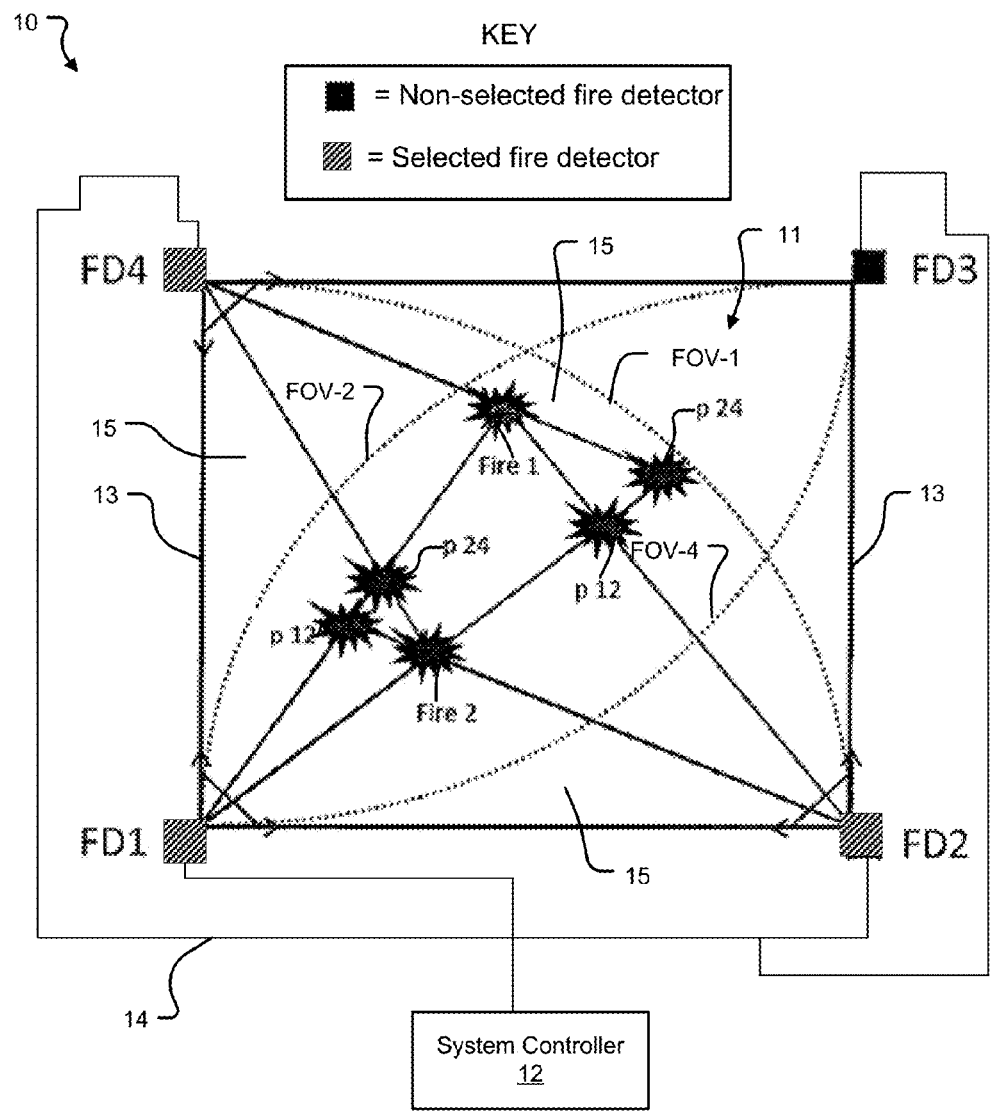
FIG. 16 is a schematic drawing of the fire detection system implementing the validation process of FIG. 15 using a third fire detector.

As an example, FIG. 16 illustrates the implementation of the process illustrated in FIG. 15 for all possible pairs of fire clusters C resulting in a combination of real and phantom fires. For example, suppose M fire clusters C are being reported by the first fire detector FD1 and N fire clusters C are being reported by the second fire detector FD2. Suppose all M fire clusters C of the first fire detector FD1 are combined with N fire clusters C of the second fire detector FD2 resulting in a triangulated fire location list, it will have M×N fire locations. This list will obviously have phantom fires. Subsequently M fire clusters C from the first fire detector FD2 will be combined with K fire clusters C from the third fire detector FD4 for triangulation and results in M×K fire locations. Based on the common field of view or partially overlapping view 15 of the detector pairs, the common fire locations in both the lists will be considered as valid fire locations and others can be rejected as phantom fires. For example, as shown in FIG. 16, the validation & pairing module 20 can determine that Fire 1 and Fire 2 are actual fires whereas fires p12, p24 are phantom fires.

The partially overlapping view 15 is based on one or more intersections between the first fire detector's field of view FOV-1, second fire detector's field of view FOV-2, and third fire detector's field of view FOV-4. The inherent mechanism of this method can easily be extended to more numbers of fire detector pairs having a partially overlapping view 15 (i.e., common field of view) in the protected area 11. For example, the method may consider four pairs of fire detectors using four fire detectors FD1, FD2, FD3 and FD4.

The process of validation of computed fire location is described as below:

Input: Fire clusters array of at least three adjacent fire detectors FD1, FD2, FD3

Process:
a. Compute fire locations using all possible combinations of fire clusters from a pair of fire detectors FD1, FD2.
b. Repeat "step a" for the other adjacent pair of fire detectors FD4, FD1 where one fire detector FD4 is common with the pair FD1, FD2 used in "step a",
c. Identify the common fire locations computed in steps 'a' and 'b', which represents actual fires. The other computed fires are considered phantom fires and hence eliminated.

Output: Validated fire locations, which represents real fire.

Computing fire locations using all possible combinations of fire clusters C from a pair of fire detectors FD1, FD2 can be described mathematically as follows:
1. M numbers of fire clusters C for a first fire detector FD1 and N numbers of fire clusters C for a second fire detector FD2 are acquired.
2. indices are initialized→i=1; j=1
3. Triangulated fire location Lij is computed using fire cluster pair FD1Ci and FD2Cj
4. Lij is accumulated into L1 and j is incremented
5. Is j>N?
   5A. If Yes, move onto step 6,
   5B. If No, step 3 is repeated
6. j=1 and i is incremented
7. Is I>M?
   7A. Yes, the process ends.
   7B. No, step 3 is repeated.

There is another method to verify if the fire clusters C are consistently paired. The epochs of the detection of fire clusters C are recorded in the sequence of respective occurrence for a set of fire detectors FD1 to FD4. The pair of fire clusters from different fire detectors FD which were validated can be verified for consistency by examining the correlation of time cluster detection epochs. The cluster detection corresponding to a unique fire which is in the partially overlapping view 15 (i.e., common field of view) of two fire detectors FD1, FD2 mainly depend upon the intensity of fire and the distance of the fire from the fire detectors FD1, FD2.

Figure 17:
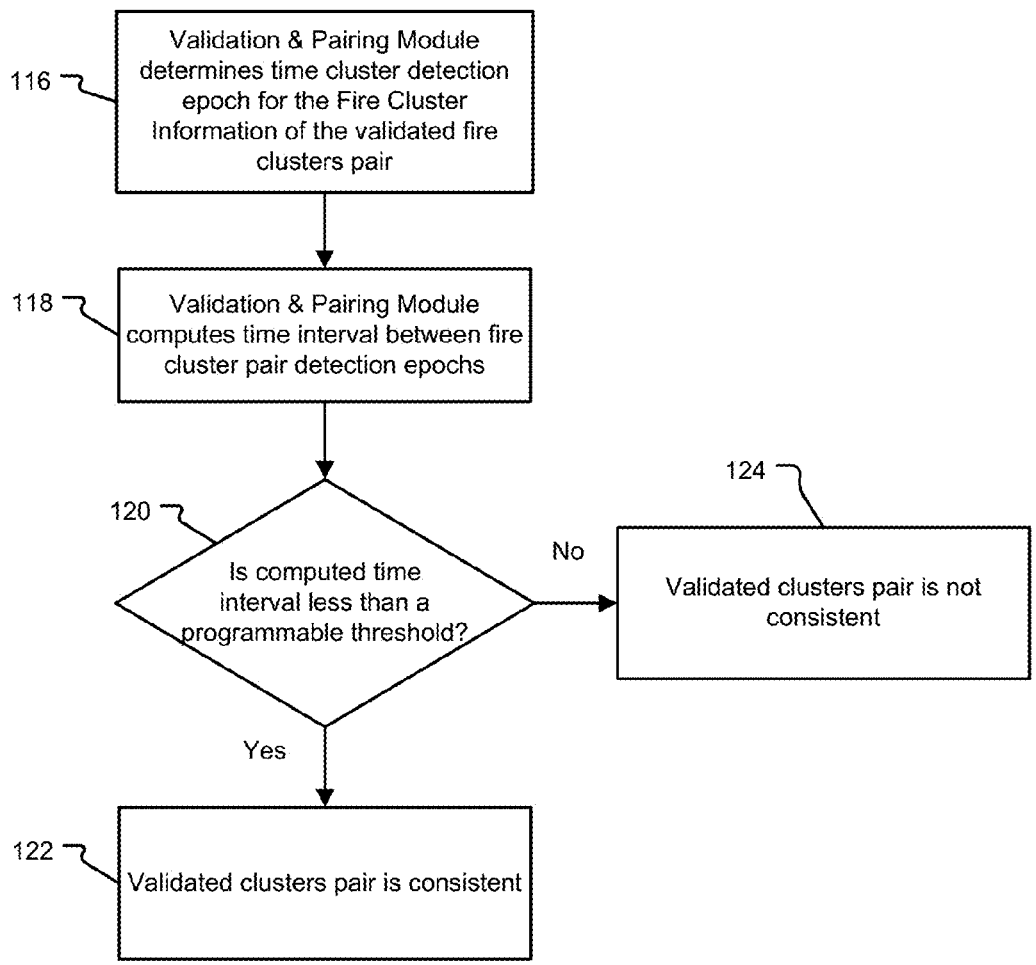
FIG. 17 is a flowchart illustrating the steps performed by the validation & pairing module for implementing a validation process using fire cluster pair detection epochs.

FIG. 17 shows this validation process 78. It is based on fire cluster detection epochs and includes the following steps:

In step 116, the validation & pairing module 20 determines a time cluster detection epoch for the fire cluster information of the validated fire cluster pair. Next, in step 118, the validation & pairing module 20 computes a time interval between the fire cluster pair detection epochs. The resulting computed time interval is compared with a programmable threshold value to determine if the computed time interval is less than the programmable threshold (step 120). If the result is less than the programmable threshold, then the paired clusters are verified as consistently paired (step 122). Otherwise, if the result is equal or more than the programmable threshold, than the paired clusters are verified as not being consistently paired (step 124).

Returning to FIG. 5, the validated fire clusters are passed to the A triangulation module 22 that computes depth information from the fire cluster information (specifically from the 2D fire cluster center data) of the fire detectors and provides 3D data output representing the fire location, "Development of a robotic local suppression system for the marine environment," located at http://www.nfpa.org/~/media/Files/Research/Research%20Foundation/foundation%20proceedings/glockling.pdf, from The Fire Protection Research Foundation, from the National Fire Protection Foundation, and incorporated herein by reference in its entirety, describes in its Section 3.1 one way to implement a triangulation algorithm. It is quite possible that the triangulation algorithm produces multiple 3D-data outputs corresponding to a unique fire, but the actual fire location can be filtered out using different detector pairs based on the system configuration.

Figure 18:
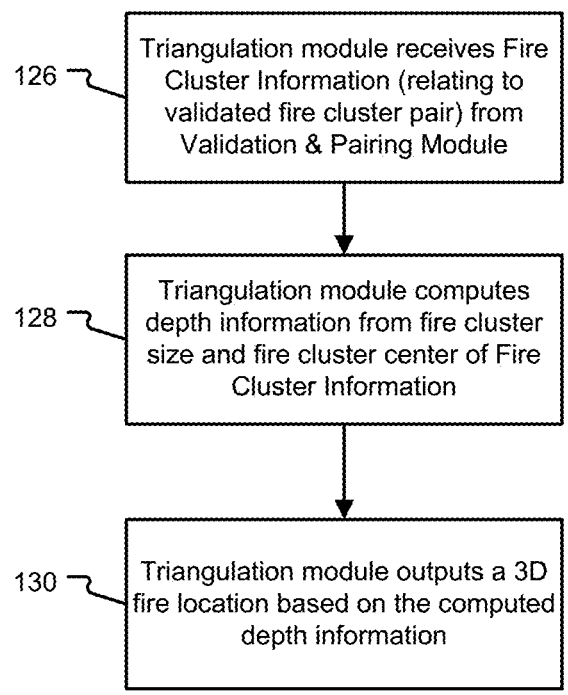
FIG. 18 is a flowchart illustrating the steps performed by a triangulation module of the system controller.

FIG. 18 lustrates the steps used to triangulate the fire cluster information to generate a 3D fire location. In step 126, the triangulation module 22 receives fire cluster information (relating to validated fire cluster pairs) from the validation & pairing module 20. Next, in step 128, the triangulation module 22 computes depth information from fire cluster size and fire cluster center of the fire cluster information. The triangulation module 20 outputs a 3D fire location based on the computed depth information (step 130).

The calibration module 24 of FIG. 5 ensures the accuracy of fire location information, It depends on stable mounting and appropriate positioning of the fire detectors FD. The residual errors in mounting will lead to errors in the fire location estimation.

In one embodiment, a calibration process is executed during installation and offset is computed to compensate for any positioning misalignments resulting in accuracy improvements. However it is not always practical to light fires in the installation locations for calibration purposes. A solution to this problem uses a non-intrusive image processing technique which can be applied to both composite fire detectors or video based fire detectors.

Figure 19:
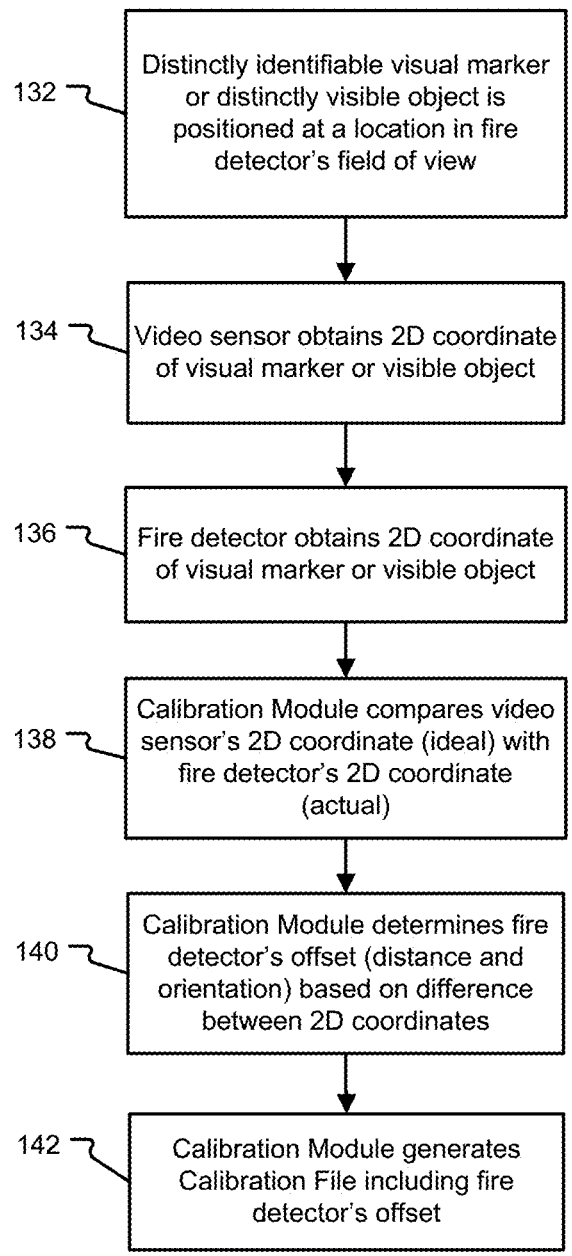
FIG. 19 is a flowchart illustrating the steps performed by a calibration module of the system controller to generate a calibration file for each fire detector.

This calibration process is illustrated in FIGS. 19 and 20 and includes the following steps. In step 132, a distinctly identifiable visual marker 162 is positioned or placed at a specified location in a fire detector's field of view or a distinctly visible object 162 in the common field of view of the fire detector FD is considered. The projection of the marker 162 or the distinctly visible object 162 on a captured video frame is generally analyzed and the displacement between ideal position as per the geometry and the projected position is used as a baseline error. This baseline error can be compensated directly or scaled down to required resolution in the triangulation computations.

The process of triangulation involves solving a set of equations which uses trigonometric identities and takes as input relative angular orientations of the fire detectors FD in a physical setup. Minor residual misalignment issues in physical setups will have to be compensated by adding certain offsets to the raw 2D coordinates of the fire cluster data. An ideal approach to determine the offsets is to create a controlled fire source in the protected area 11 and observe the deviations from the expected 2D data for that fire However it might be prohibitive to be able to create even a controlled fire in the protected area 11.

In such cases, a video sensor can be used to overcome this difficulty. In step 134, a video sensor VS obtains a 2D coordinate of the visual marker or visible object. In particular, this video sensor VS is used to determine 2D coordinates for predefined markers 162 in the protected area 11. In step 136, the fire detector FD obtains a 2D coordinate of the visual marker or visible object 162. The calibration module 24 compares video sensor's 2D coordinate (ideal) with fire detector's 2D coordinate (actual) in step 138. In step 140, the calibration module 24 determines fire detector's offset (distance and orientation) based on the comparison. The calibration module 24 generates an output in the form of a calibration file (step 142).

Figure 20A:
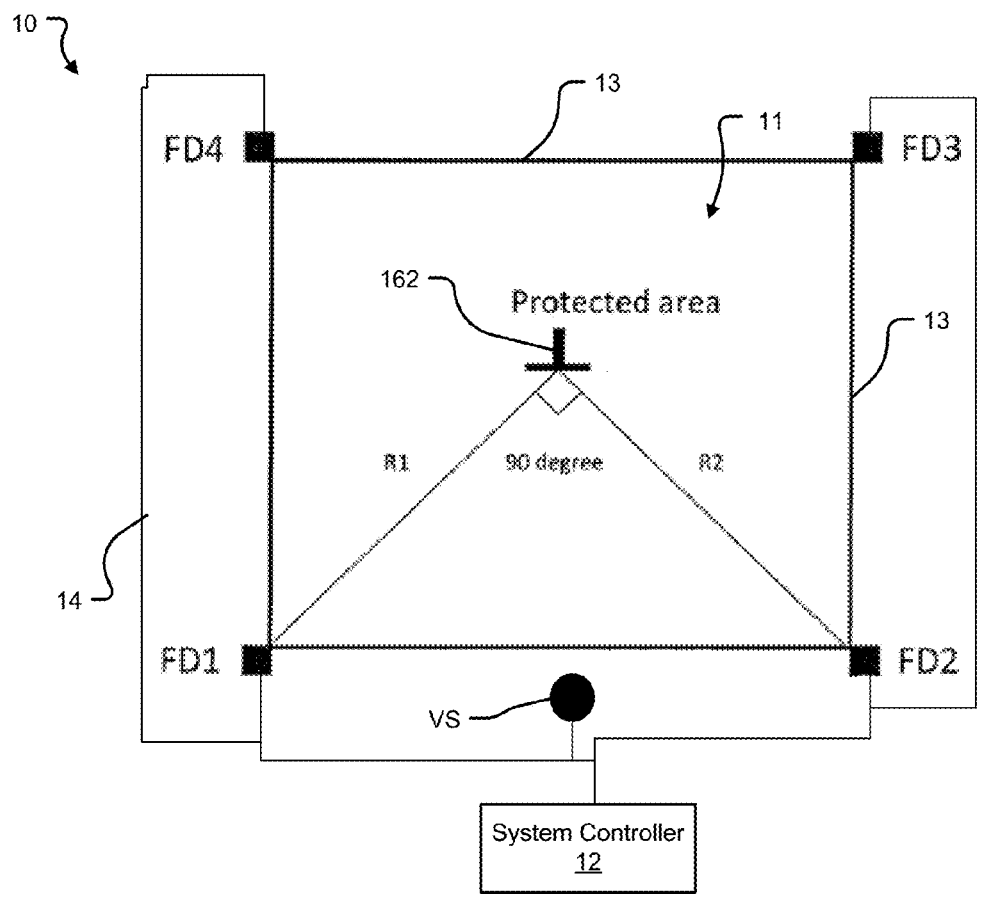
FIG. 20A is a schematic drawing of the fire detection system implementing the non-intrusive calibration process of FIG. 19 for each fire detector.

Knowing the relative offset, both in distance and in orientation, between the fire detector FD and the video sensor VS, an estimate in the form of the calibration file 64 can be made for offset to be used for the fire detector FD. FIG. 20A illustrates a reference layout of the fire detectors being calibrated using the video sensor VS and the visual marker 162 or visible object 162 in the protected area 11

Figure 20B:
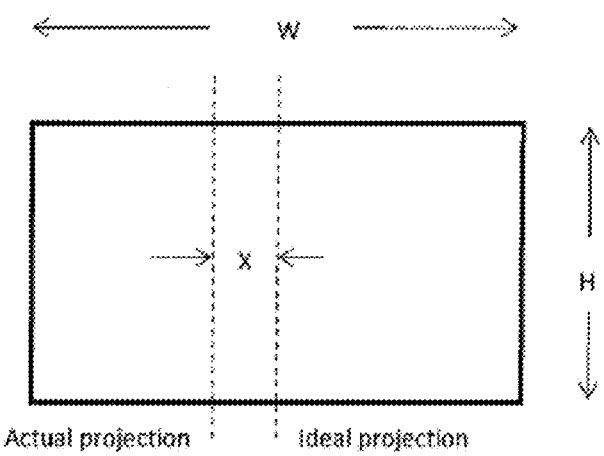
FIG. 20B is a camera display of a measured calibration offset generated by the fire detection system in FIG. 20A.

FIG. 20B illustrates a computer display of the measured offset X for a video sensor VS. Instead of predefined markers any distinctly visible object from the protected area 11 in the common field of view of a given pair detectors FD1, FD2 can be used in computing the calibration offset data.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire detection system, comprising:
   at least two spatially resolved fire detectors having at least a partially overlapping field of view of a protected area to generate fire cluster information for the protected area;
   a system controller that receives the fire cluster information from the fire detectors and pairs fire clusters detected by the at least two fire detectors and validates the fire cluster pairs as representing a fire;

wherein the system controller validates fire cluster pairs based on time cluster detection epochs by computing a time interval between the detection of the fire clusters by the at least two fire detectors, comparing the resulting computed time interval with a programmable threshold value, and if the computed time interval is less than the programmable threshold, then validating the fire cluster pairs as consistently paired, and if the computed time interval is greater than the programmable threshold value, then indicating the fire cluster pairs as not being consistently paired.

2. A fire detection system as claimed in claim 1, further comprising a preprocessor module for averaging the acquired fire cluster information over time prior to the validation process.

3. A fire detection system as claimed in claim 1, wherein each fire detector comprises a two-dimensional infrared sensor array.

4. A fire detection system as claimed in claim 1, wherein the system controller further determines a three-dimensional fire location for validated fire cluster pairs.

5. A fire detection system as claimed in claim 1, wherein the fire cluster information comprises a fire cluster center, a fire cluster size, and/or an alarm status of the fire cluster.

6. A fire detection system as claimed in claim 1, wherein the system controller validates fire cluster pairs based on the geometry of the placement of the fire detectors when two fires may arise along the same line of sight for one of the fire detectors.

7. A fire detection system as claimed in claim 1, wherein the system controller validates fire cluster pairs based on regions of interest for the at least two fire detectors by validating fire cluster pairs when they occur in matching regions of interest for the two fire detectors.

8. A fire detection system as claimed in claim 1, wherein the system controller validated fire cluster pairs derived from the at least two fire detectors by reference to fire cluster information from additional fire detectors.

9. A fire detection method, comprising:
generating fire cluster information with at least two spatially resolved fire detectors having at least a partially overlapping field of view of a protected area;
receiving the fire cluster information from the fire detectors and pairing fire clusters detected by the at least two fire detectors; and
validating the pairs of fire clusters as representing a fire based on time cluster detection epochs by computing a time interval between the detection of the fire clusters by the at least two fire detectors, comparing the resulting computed time interval with a programmable threshold value, and if the computed time interval is less than the programmable threshold, then validating the fire cluster pairs as consistently paired, and if the computed time interval is greater than the programmable threshold value, then indicating the fire cluster pairs as not being consistently paired.

10. A fire detection method as claimed in claim 9, further comprising averaging the acquired fire cluster information over time prior to the validation.

11. A fire detection method as claimed in claim 9, wherein each fire detector comprises a two-dimensional infrared sensor array.

12. A fire detection method as claimed in claim 9, further comprising determining a three-dimensional fire location for validated fire cluster pairs.

13. A fire detection method as claimed in claim 9, wherein the fire cluster information comprises a fire cluster center, a fire cluster size, and/or an alarm status of the fire cluster.

14. A fire detection method as claimed in claim 9, wherein validating the fire cluster pairs comprises determining a geometry of the placement of the fire detectors and accounting when two fires may arise along the same line of sight for one of the fire detectors.

15. A fire detection method as claimed in claim 9, wherein validating the fire cluster pairs comprises validating fire cluster pairs based on regions of interest for the at least two fire detectors by validating fire clusters pairs when they occur in matching regions of interest for the two fire detectors.

16. A fire detection method as claimed in claim 9, wherein validating the fire cluster pairs comprises validating fire cluster pairs derived from the at least two fire detectors by reference to fire cluster information from additional fire detectors.

* * * * *